(12) United States Patent
Jacquemard et al.

(10) Patent No.: US 11,828,231 B2
(45) Date of Patent: Nov. 28, 2023

(54) AUXILIARY OIL TANK FOR AN AIRCRAFT TURBINE ENGINE

(71) Applicant: SAFRAN AIRCRAFT ENGINES, Paris (FR)

(72) Inventors: Christophe Paul Jacquemard, Moissy-Cramayel (FR); Didier Gabriel Bertrand Desombre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 350 days.

(21) Appl. No.: 17/278,257

(22) PCT Filed: Sep. 17, 2019

(86) PCT No.: PCT/FR2019/052163
§ 371 (c)(1),
(2) Date: Mar. 19, 2021

(87) PCT Pub. No.: WO2020/065179
PCT Pub. Date: Apr. 2, 2020

(65) Prior Publication Data
US 2021/0355875 A1    Nov. 18, 2021

(30) Foreign Application Priority Data

Sep. 24, 2018   (FR) ...................................... 1858629

(51) Int. Cl.
*F02C 7/06* (2006.01)
*B64D 27/02* (2006.01)
(Continued)

(52) U.S. Cl.
CPC ................ *F02C 7/06* (2013.01); *B64D 27/02* (2013.01); *F01D 25/18* (2013.01); *F16H 57/045* (2013.01);
(Continued)

(58) Field of Classification Search
CPC . F02C 7/06; B64D 27/02; F01D 25/18; F16H 57/045; F16H 57/0479;
(Continued)

(56) References Cited

U.S. PATENT DOCUMENTS 3,797,561 A * 3/1974 Clark ........................ F28F 3/12
60/39.83
4,137,705 A * 2/1979 Andersen ............... F28D 9/0025
60/728

(Continued)

FOREIGN PATENT DOCUMENTS

EP   1925856 A2   5/2008
EP   3327260 A1   5/2018

OTHER PUBLICATIONS

International Search Report and Written Opinion received in corresponding international application No. PCT/FR2019/052163, filed Sep. 17, 2019, 9 pages.

*Primary Examiner* — Michael A Riegelman
(74) *Attorney, Agent, or Firm* — Christensen O'Connor Johnson Kindness PLLC

(57) ABSTRACT

An auxiliary tank for an aircraft turbine engine has a curved general shape, and includes a cylindrical or frustoconical radially outer wall and three cylindrical or frustoconical radially inner walls arranged facing the radially outer wall, the three radially inner walls having a middle wall and two side walls arranged to either side of the middle wall. The inner volume of the tank forms a U-shape, the branches of which are formed by lateral volume portions between the side walls and the radially outer wall, and the base of which is formed by a middle volume portion between the middle wall and the radially outer wall.

10 Claims, 6 Drawing Sheets

(51) Int. Cl.
*F01D 25/18* (2006.01)
*F16H 57/04* (2010.01)

(52) U.S. Cl.
CPC .... *F05D 2220/323* (2013.01); *F05D 2260/98* (2013.01)

(58) Field of Classification Search
CPC .......... F05D 2220/323; F05D 2260/98; F05D 2260/30; Y02T 50/60
See application file for complete search history.

(56) References Cited

U.S. PATENT DOCUMENTS

| | | | | |
|---|---|---|---|---|
| 5,245,820 A | * | 9/1993 | Zalewski | F02C 7/277 60/39.08 |
| 7,216,473 B1 | * | 5/2007 | McArthur | F01D 25/18 60/39.08 |
| 8,517,148 B2 | * | 8/2013 | Portlock | F01D 25/18 184/6.12 |
| 8,627,667 B2 | * | 1/2014 | Lozier | B64D 37/04 60/39.08 |
| 9,903,227 B2 | * | 2/2018 | Cigal | F01D 25/18 |
| 10,683,774 B2 | * | 6/2020 | Chalaud | F01D 25/20 |
| 2002/0083983 A1 | * | 7/2002 | Coha | F02M 37/0094 137/565.22 |
| 2010/0326048 A1 | * | 12/2010 | Lozier | F02K 3/06 60/262 |
| 2012/0103728 A1 | * | 5/2012 | Portlock | F16H 57/0479 184/6.12 |
| 2016/0131034 A1 | * | 5/2016 | Chilton | F16C 33/6681 184/6.11 |
| 2016/0160686 A1 | * | 6/2016 | Cigal | F16H 57/045 184/6.11 |
| 2018/0156066 A1 | * | 6/2018 | Chalaud | F02C 7/32 |
| 2018/0321073 A1 | * | 11/2018 | Cleyet | F01M 11/12 |
| 2021/0355875 A1 | * | 11/2021 | Jacquemard | F16H 57/0479 |

\* cited by examiner

AUXILIARY OIL TANK FOR AN AIRCRAFT TURBINE ENGINE

TECHNICAL FIELD

The field of the present invention is that of aircraft turbomachines, in particular that of the storage of lubrication oil for such turbomachines.

BACKGROUND

A turbomachine, such as a dual flow turbofan engine of an aircraft, typically comprises an air inlet comprising a shrouded fan whose outlet airflow divides into an airflow that enters the engine section and forms a hot flow (or primary flow), and an airflow that flows around the engine section and forms a cold flow (or secondary flow).

The engine part typically comprises, from upstream to downstream in the direction of gas flow, at least one compressor, a combustion chamber, at least one turbine, and an exhaust nozzle in which the combustion gases leaving the turbine (primary flow) are mixed with the secondary flow. A turbomachine may also be of the "double-body" type, which means that it comprises two rotors arranged coaxially. A first body is called a low pressure body and a second body is called a high pressure body. In this case, as is well known, the engine part comprises, from upstream to downstream, a low-pressure compressor, a high-pressure compressor, the combustion chamber, a high-pressure turbine and a low-pressure turbine.

In the case of a turbomachine with reducer, the turbine shaft drives the fan shaft via a speed reducer which reduces the speed of rotation of the fan shaft in relation to that of the turbine shaft.

Depending on the type of reducer used, planetary or epicyclic, the fan shaft will rotate in the same direction or in the opposite direction to the turbine shaft. A planetary or epicyclic reducer comprises each at least one epicyclic gear train (comprising at least one sun gear, one planet carrier, planets and one ring gear) arranged in a defined configuration.

More precisely, an epicyclic reducer comprises, in particular, a fixed ring gear and a planet carrier integral with the fan shaft, each planet gear thus comprising a movable axis of rotation.

The turbine shaft, which is the low-pressure turbine shaft in the case of a double-body turbomachine, is usually coupled to a low-pressure compressor shaft, which in turn is coupled to an input shaft of the reducer. This input shaft is rotationally coupled to the sun gear of the reducer to drive it in rotation.

The fan shaft is, for example, guided in rotation relative to a fixed structure via two bearings which are spaced apart and located upstream of the speed reducer. The input shaft is guided in rotation relative to the fixed structure via a bearing located downstream of the speed reducer.

The reducer is housed in an annular lubrication enclosure and, in the current technology, its operation to ensure the lubrication and the cooling of its pinions and bearings is guaranteed by a supply circuit and a main lubrication circuit of the turbomachine, which requires the turbomachine to operate.

However, during the phases of free rotation of the fan due to the effect of air flows flowing through the fan (called windmilling), the engine does not operate and the supply circuit and the main lubrication circuit does not ensure the lubrication of the reducer, which can lead to seizure or breakage of the toothing of the reducer.

The invention aims to solve these drawbacks by offering a solution compatible with all the operating phases of the turbomachine, and in particular those in which the engine does not operate.

DESCRIPTION OF THE INVENTION

For this purpose, the invention concerns an auxiliary oil tank for an aircraft turbomachine, comprising a curved general shape whose radius of curvature is centred on an axis intended to correspond to an axis of the turbomachine, this tank comprising a cylindrical or frustoconical radially outer wall and three cylindrical or frustoconical radially inner walls arranged opposite said radially outer wall, the three radially inner walls comprising a middle wall and two side walls arranged on either side of the middle wall, the middle wall having a mean radius of curvature greater than the mean radius of curvature of said side walls so that the inner volume of the tank substantially forms a U-shape, the branches of which are formed by lateral volume portions between the side walls and the radially outer wall and the base of which is formed by a middle volume portion between the middle wall and the radially outer wall.

The tank according to the invention has an adapted shape giving it the interesting advantage of being able to be mounted on a turbomachine casing and of being able to be used in any type of turbomachine, comprising a reducer or not, for the spontaneous recovery of lubrication oil.

Advantageously, the tank comprises an oil inlet located on the middle wall.

Advantageously, the lateral volume portions are connected to gas outlets.

Advantageously, the tank comprises an oil outlet intended to be connected by a hose to a pump, e.g. powered by an electric motor.

The invention also concerns a turbomachine casing, comprising two coaxial annular walls, one forming the inner casing of the turbomachine, extending inside the other, forming the inter-duct casing of the turbomachine, and connected together by an annular row of arms intended to be swept by a flow of gas during operation, at least one of these arms being hollow and comprising a first inner passage for oil recovery, characterised in that it comprises a second inner passage for oil recovery and for conveying this oil to an auxiliary tank comprising one of the above-mentioned characteristics.

According to an embodiment, said passages for oil recovery are formed in the inter-duct casing and are formed by two channels separated by a partition and arranged side by side in the same plane passing through the axis of revolution of the inner casing and of the inter-duct casing.

Advantageously, the inter-duct casing comprises two radially outer annular rims between which the auxiliary tank is mounted according to the invention.

Advantageously, the middle wall of the auxiliary tank is located perpendicularly to said hollow arm and the side walls are located perpendicularly to inter-arm spaces.

The tank and the casing according to the invention have many advantages. These comprise, in particular:
the particular positioning of the tank in an inter-vein space allowing the inner volume of the auxiliary tank according to the invention to be adapted to the requirements, for example depending on the size of the turbomachine;
allowing spontaneous filling of the auxiliary tank, for example to ensure good lubrication of the reducer;

being easily and quickly mounted and fixed on the casing of the turbomachine and removed from the latter.

The invention also concerns an aircraft turbomachine characterised in that it comprises a casing according to the invention, in which the centring axis of the radius of curvature of the auxiliary tank 20 corresponds to the longitudinal axis of the turbomachine.

Advantageously, the turbomachine according to the invention comprises a reducer, a main lubrication oil tank and a main lubrication circuit, an auxiliary oil tank, an auxiliary lubrication circuit, the auxiliary tank being connected to the reducer via the second inner passage of oil recovery, the main tank and the main lubrication circuit being configured to lubricate the reducer when the turbomachine is active, and the auxiliary tank and the auxiliary lubrication circuit being configured to lubricate the reducer when the turbomachine is not active.

The invention further relates to a method of lubricating a reducer of an aircraft turbomachine according to the invention, comprising a step of activating the pump so that oil arrives from the auxiliary tank to the reducer as soon as a phase of free rotation of the fan is detected.

Thus, the reducer is always lubricated, even during the phases of free rotation of the fan, thus ensuring a longer life of the reducer gears.

DESCRIPTION OF FIGURES

The present invention will be better understood and other details, characteristics and advantages of the present invention will appear more clearly on reading the description of a non-limiting example which follows, with reference to the annexed drawings on which.

DETAILED DESCRIPTION

In this specification, the terms "upstream" and "downstream" are used to refer to the direction of gas flow in an aircraft turbomachine. The terms "inner", "outer", "radial", "axial" are defined in relation to an axis of the centres of curvature of the walls constituting the auxiliary tank according to the invention.

Figure 1:
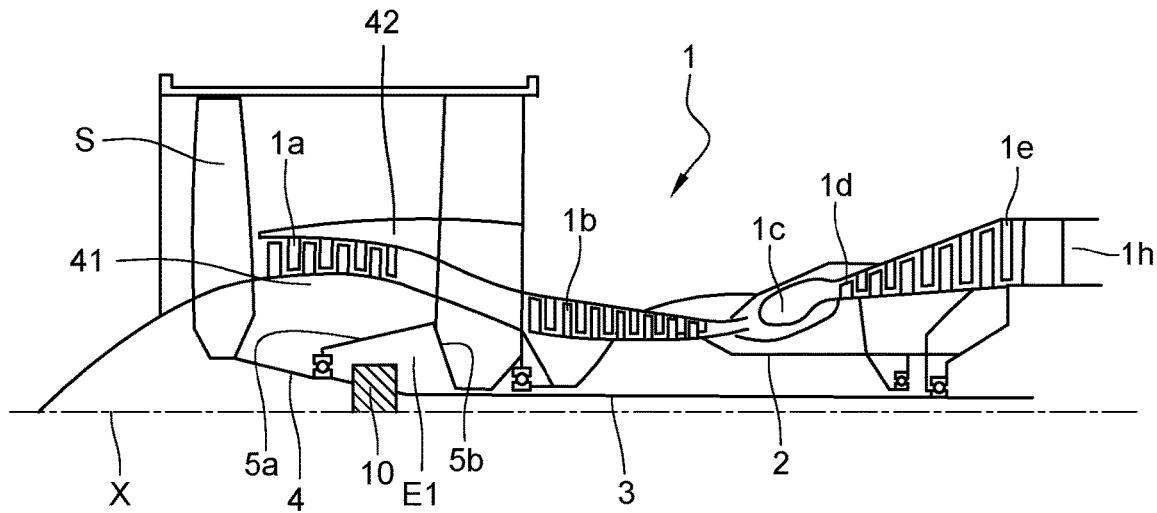
FIG. 1 is a schematic sectional view of a turbomachine.

FIG. 1 shows a turbomachine 1 which comprises, conventionally centred on a longitudinal axis X, a fan S, a low-pressure compressor 1*a*, a high-pressure compressor 1*b*, an annular combustion chamber 1*c*, a high-pressure turbine 1*d*, a low-pressure turbine 1*e* and an exhaust nozzle 1*h*. The high-pressure compressor 1*b* and the high-pressure turbine 1*d* are connected by a high-pressure shaft 2 and form with it a high-pressure body (HP). The low-pressure compressor 1*a* and the low-pressure turbine 1*e* are connected by a low-pressure shaft 3 and form with it a low-pressure body (LP).

The fan S is driven by a fan shaft 4 which is coupled to the LP shaft 3 by means of a epicylic gear reducer 10, shown here schematically.

The reducer 10 is positioned in the front part of the turbomachine. A fixed structure, here schematically comprising an upstream part 5*a* and a downstream part 5*b*, is arranged to form an enclosure E1 surrounding the reducer 10. This enclosure E1 is closed upstream by seals at a bearing allowing to pass through the fan shaft 4 and downstream by seals at the passing through of the LP shaft 3.

Such a reducer 10 must be lubricated to maintain its gears in good working condition and to guarantee an acceptable service life of the reducer 10 for an aircraft turbomachine. This means that the reducer 10 must be lubricated even when the fan is freely rotating, e.g. due to windmilling caused by the wind through the fan.

The present invention therefore proposes to add, on an aircraft turbomachine, for example in the vicinity of the reducer 10, an auxiliary oil tank 20 in addition to a main oil tank known per se. This auxiliary tank could however equip a turbomachine not equipped with a reducer.

Figure 2:
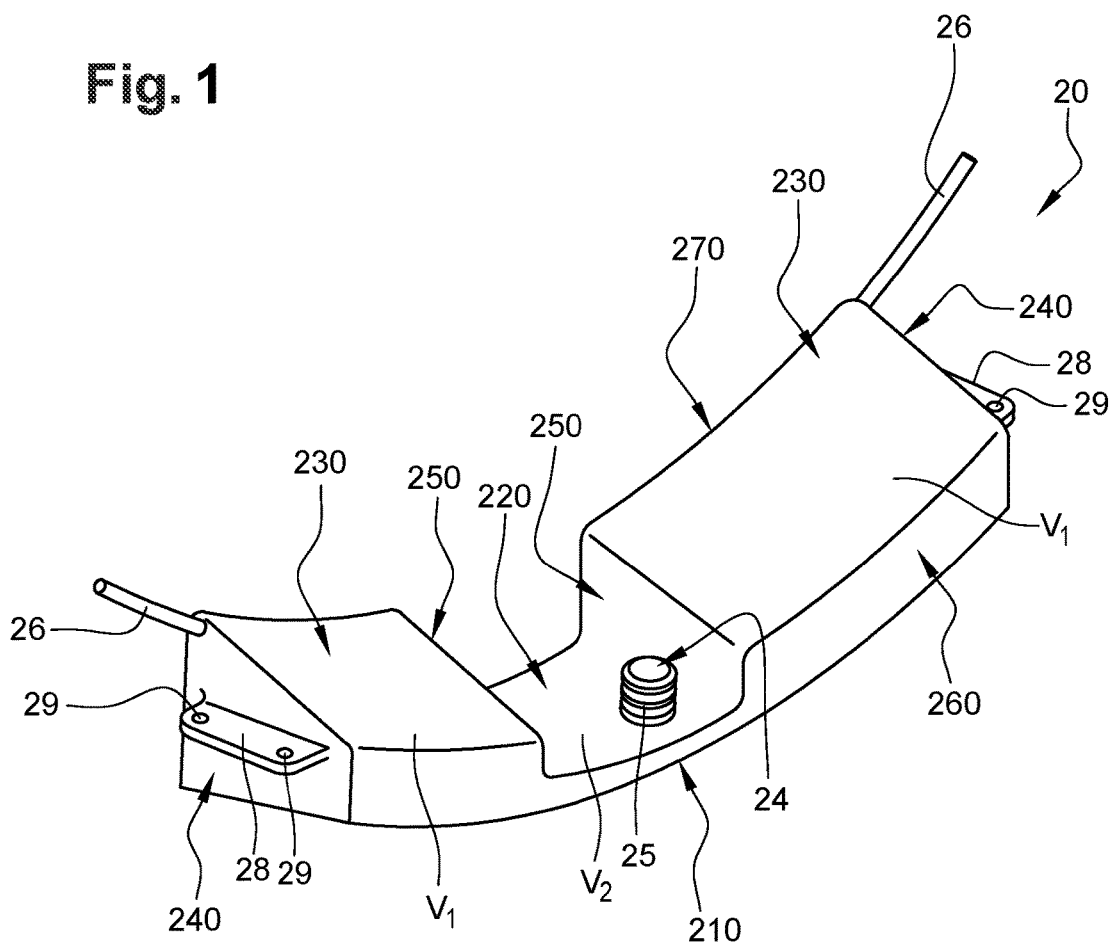
FIG. 2 is a perspective view of an auxiliary tank according to the invention.
Figure 3:
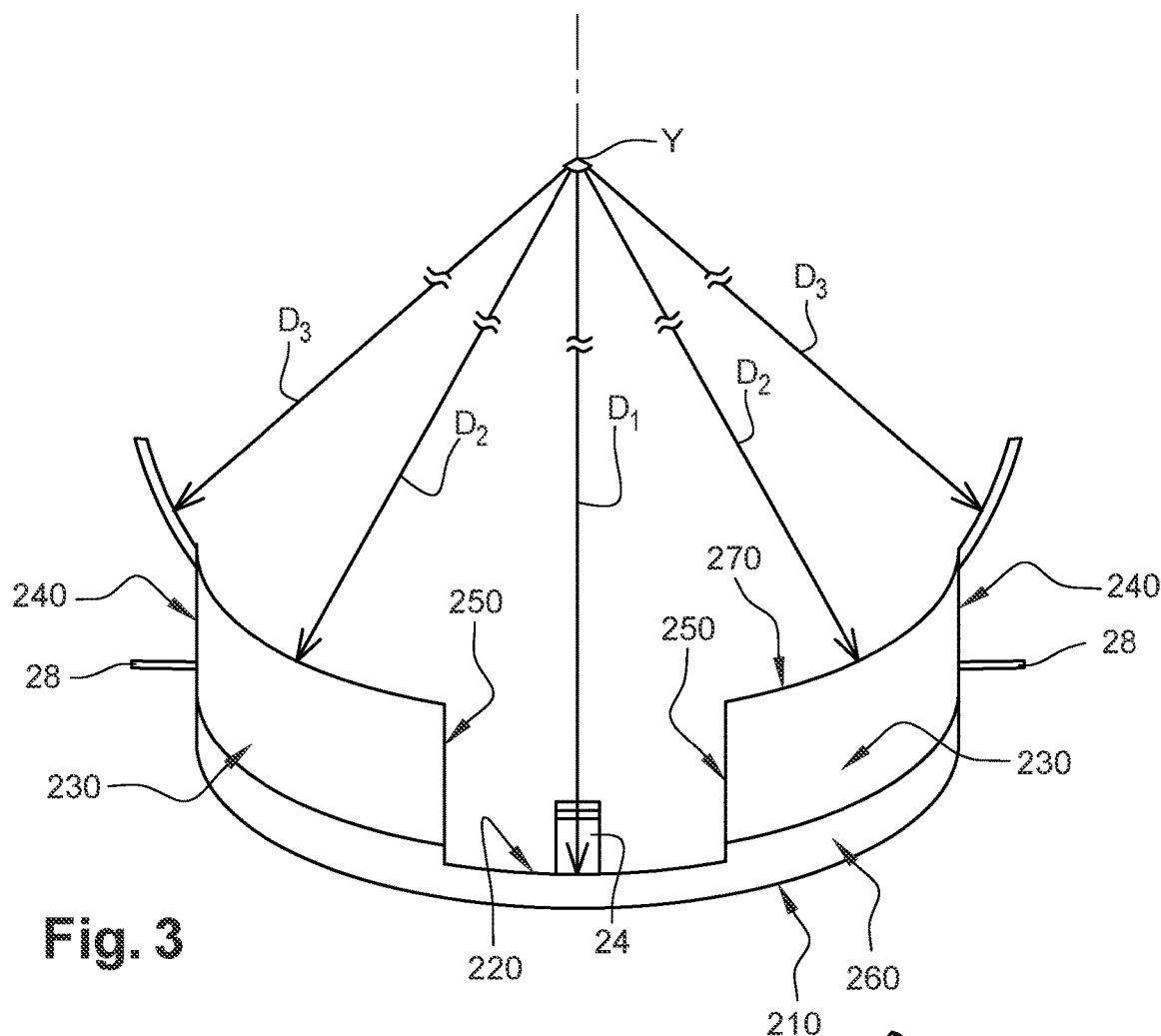
FIG. 3 is a front view of the auxiliary tank according to the invention.
Figure 4:
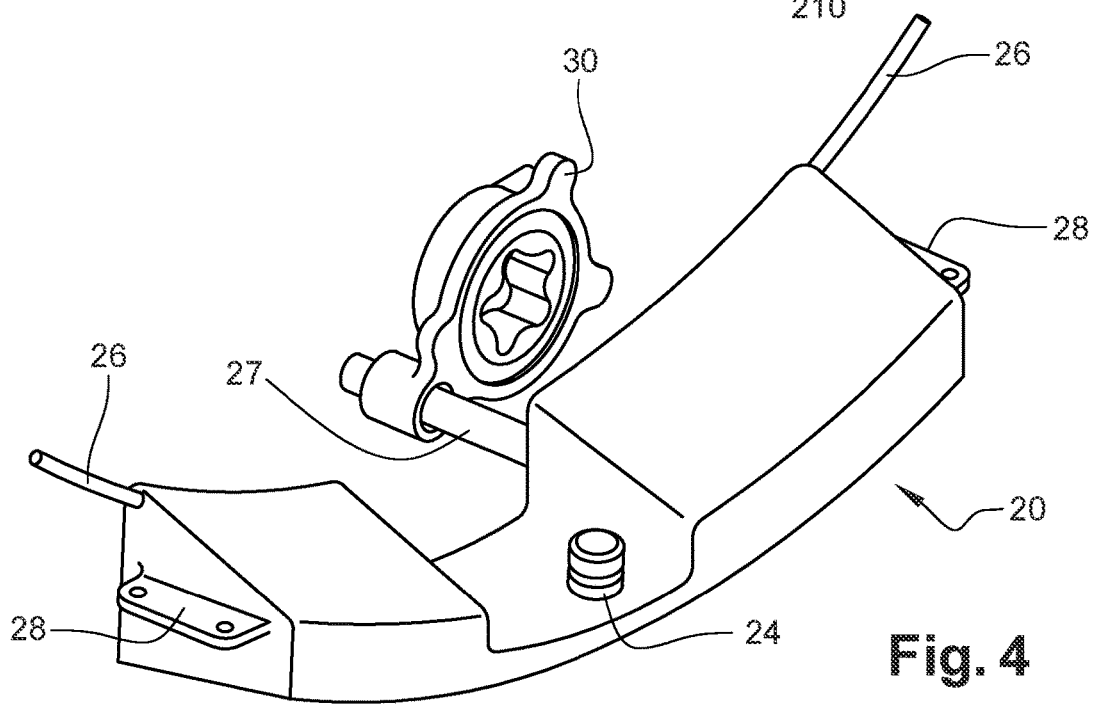
FIG. 4 is a perspective view of the auxiliary tank according to the invention provided with a lubrication pump.

Referring to FIG. 2, the auxiliary tank 20 has a curved general or circumferential shape with the radius of curvature centred on an axis Y which is intended to coincide with the longitudinal axis X of the turbomachine 1. This tank comprises one radially outer cylindrical or frustoconical wall 210 and three radially inner cylindrical or frustoconical walls 220, 230.

The radially inner walls 220, 230 are arranged opposite the radially outer wall 210. The three radially inner walls comprise a middle wall 220 and two side walls 230 arranged on either side of the middle wall 220. The middle wall 220 has a larger average radius of curvature D1 than the average radius of curvature D2 of the side walls 230.

The auxiliary tank 20 comprises walls at the circumferential ends 240. Each of these circumferential end walls 240 connects a radially inner side wall 230 to the radially outer wall 210 and forms the side edges of the tank 20.

The auxiliary tank 20 comprises further intermediate radial walls 250. Each of these intermediate radial walls 250 connects a lateral radially inner wall 230 to the middle radially inner wall 220.

The auxiliary tank 20 comprises further walls 260, 270 at the axial ends.

The tank 20 is made of any material with the necessary robustness, it can be flexible or rigid.

This means that the inner volume of the auxiliary tank 20 is approximately U-shaped. Each branch of the U is formed by a lateral volume portions between one of the side walls 230, the radially outer wall 210, one of the walls at the circumferential ends 240 and one of the intermediate radial walls 250 extended fictitiously to the radially outer wall 210. The base of the U is formed by a middle volume portion between the middle wall 220, the radially outer wall 210 and a fictitious extension of the intermediate radial walls 250 to the radially outer wall 210.

The auxiliary tank 20 comprises an oil inlet located on the middle wall 220. As illustrated, but by no means limited to, the oil inlet comprises a substantially cylindrical neck 24 protruding from the middle wall 220 and comprising an outer annular groove 25 for receiving a seal, such as an O-ring (not shown).

The lateral volume portions V1 are advantageously connected to gas outlets. According to an embodiment, the gas outlets are formed by curved general shape vent conduits 26, e.g. with the same average radius of curvature D3 as the side walls 230. These vent conduits 26 communicate with the enclosure E1 to ensure the gas flushing when the auxiliary tank 20 is filled with oil.

To enable the auxiliary tank 20 to be attached to an aircraft turbomachine 1 casing, the auxiliary tank 20 also further comprises mounting brackets 28 comprising holes 29 for screw passage. These brackets 28, for example two, are respectively arranged on walls at the circumferential ends 240 and extend circumferentially.

Figure 5:
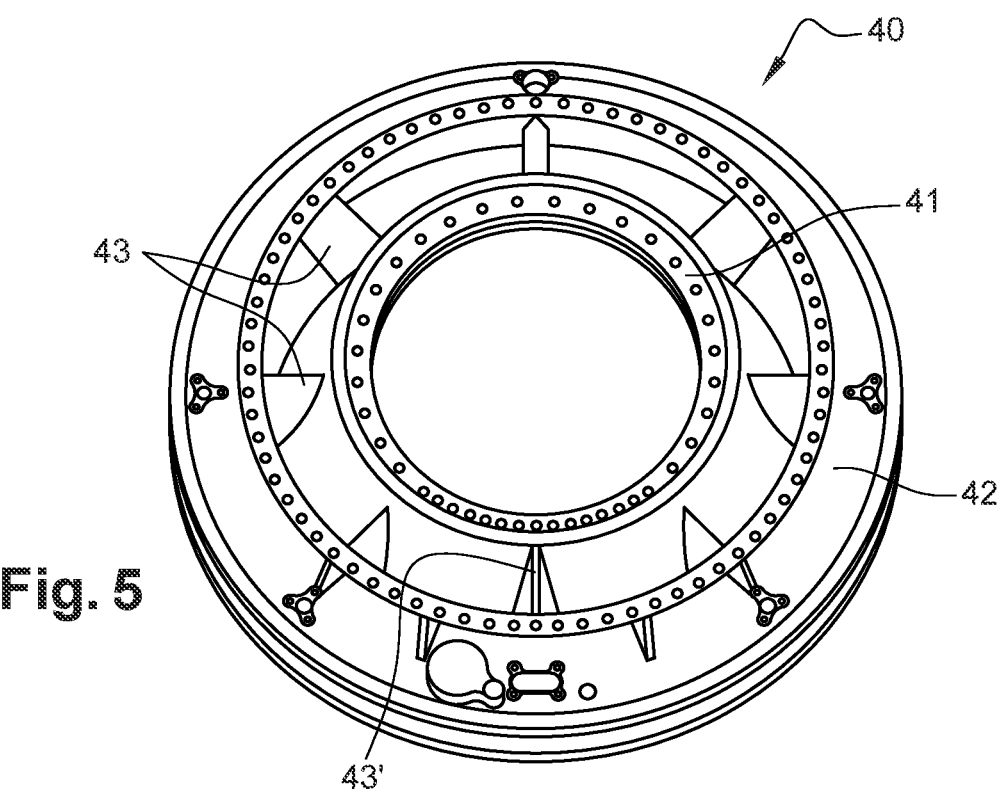
FIG. 5 is a perspective view of the rear side of a turbomachine casing according to the invention.

FIG. 5 shows a casing 40 of a turbomachine 1. This casing 40 comprises two coaxial annular walls 41, 42 extending one 41 inside the other 42, and connected together by an annular row of arms 43 which are intended to be swept by a gas flow during operation. At least one 43' of these arms 43 is hollow and comprises fluid passages 44 and 45 defined below. The inner annular wall 41 defines the inner casing 41 of the turbomachine 1 and the outer annular wall 42 defines the inter-duct casing 42 of the turbomachine 1. The inner casing 41 and the inter-duct casing 42 define the entire upstream casing of the turbomachine 1, also referred to as casing 40 in this presentation.

Figure 6:
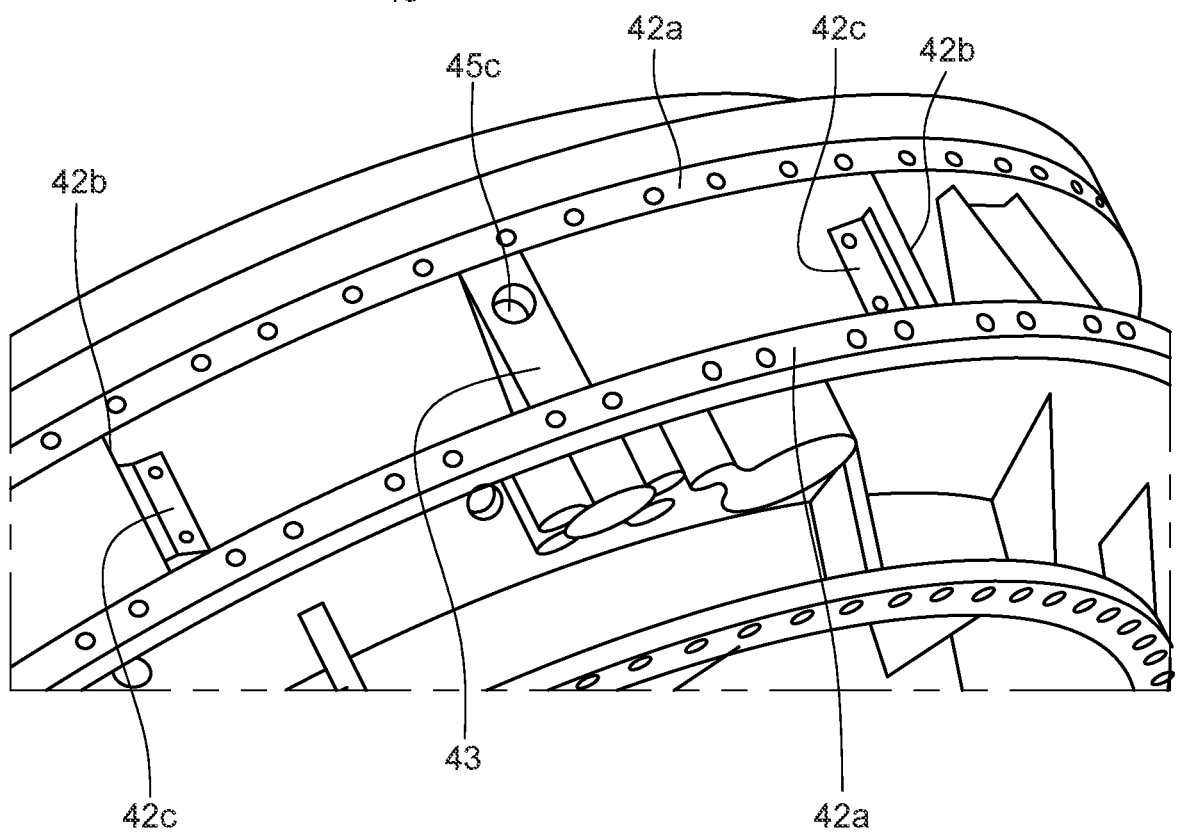
FIG. 6 is a detailed perspective view of the turbomachine casing according to the invention.

As shown in FIG. 6, the inter-duct casing 42 of the casing 40 comprises two radially outer annular rims 42a connected by stiffening ribs 42b.

Figure 7:
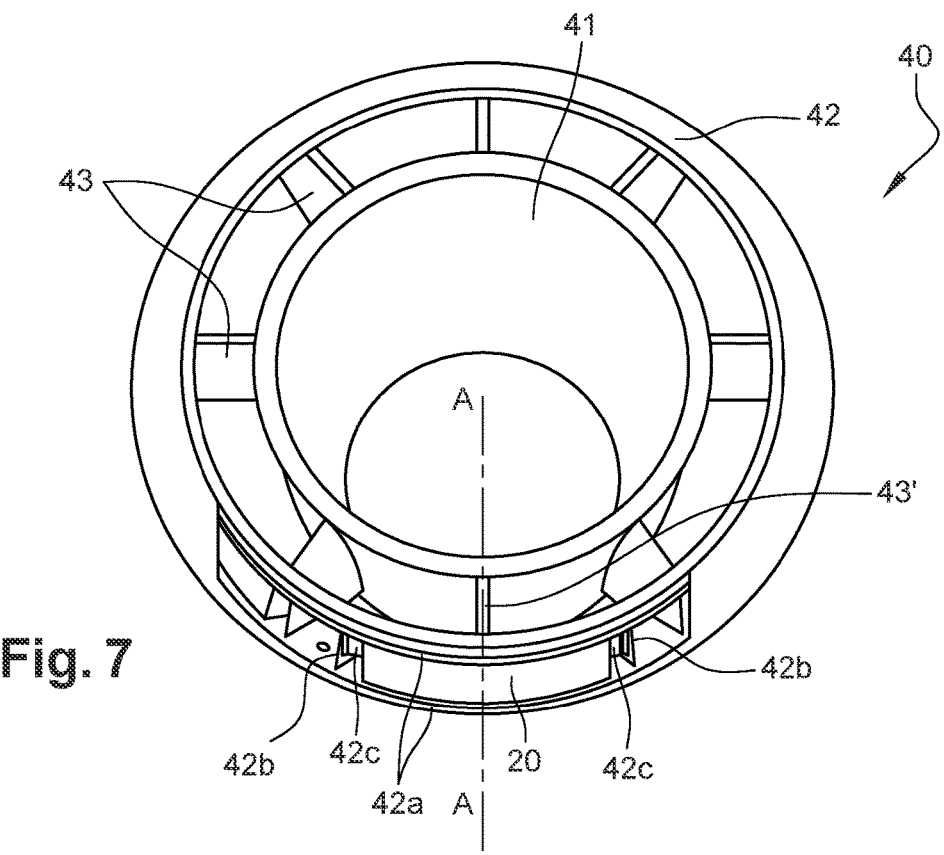
FIG. 7 is a perspective view of the front side of the casing according to the invention equipped with an auxiliary tank according to the invention.
Figure 8:
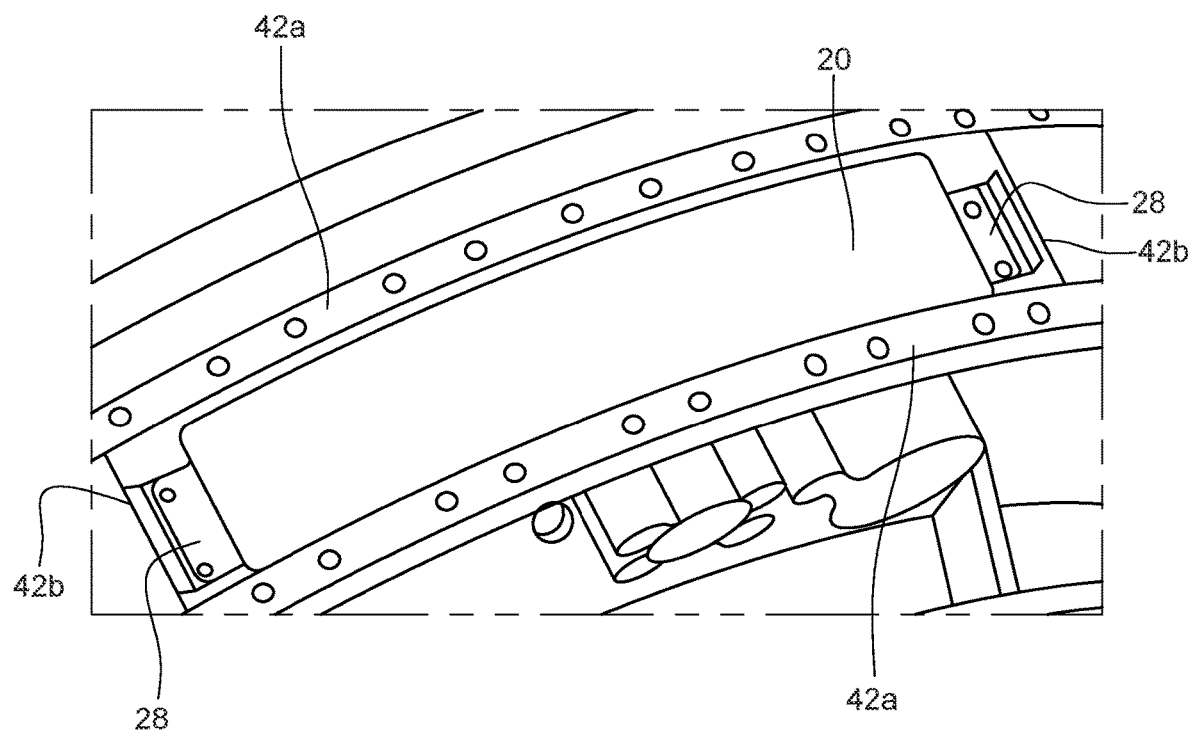
FIG. 8 is a detailed view of the auxiliary tank according to the invention mounted on the casing of the turbomachine according to the invention.

The auxiliary tank 20 is mounted between the two radially outer annular rims 42a and between two adjacent stiffening ribs 42b (see FIGS. 7 and 8). The middle wall 220 of the auxiliary tank 20 is then located perpendicularly to the hollow arm 43' and the side walls 230 are located perpendicularly to inter-arm spaces.

In fact, the auxiliary tank 20 according to the invention partly takes the shape of the inter-duct casing 42 of the turbomachine 1 and therefore has an adapted shape allowing its integration into the inter-duct casing 42 of the turbomachine 1.

The ribs 42b are provided with circumferentially extending mounting brackets 42c on their faces intended to be arranged opposite the walls 240 of the auxiliary tank 20, when the latter is mounted on the casing 40. The tank 20 is then connected to the casing 40, e.g. by screwing the mounting brackets 28 of the auxiliary tank 20 to the mounting brackets 42c of the casing 40. In another embodiment, not shown, the auxiliary tank 20 is integrated into the casing 40.

Advantageously, as shown in FIG. 7, the tank is angularly positioned at 6 o'clock, with reference to a time dial, (i.e. in the low position) when the casing 40 is mounted on an aircraft turbomachine.

Figure 9:
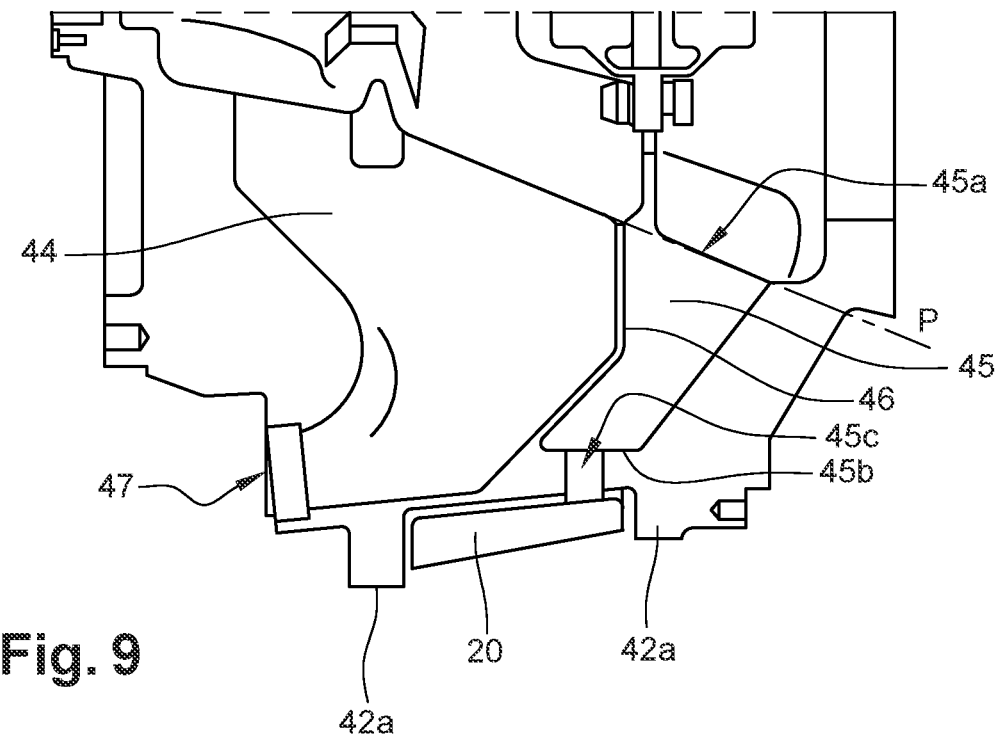
FIG. 9 is a sectional view along the axis A-A of FIG. 7.
Figure 10:
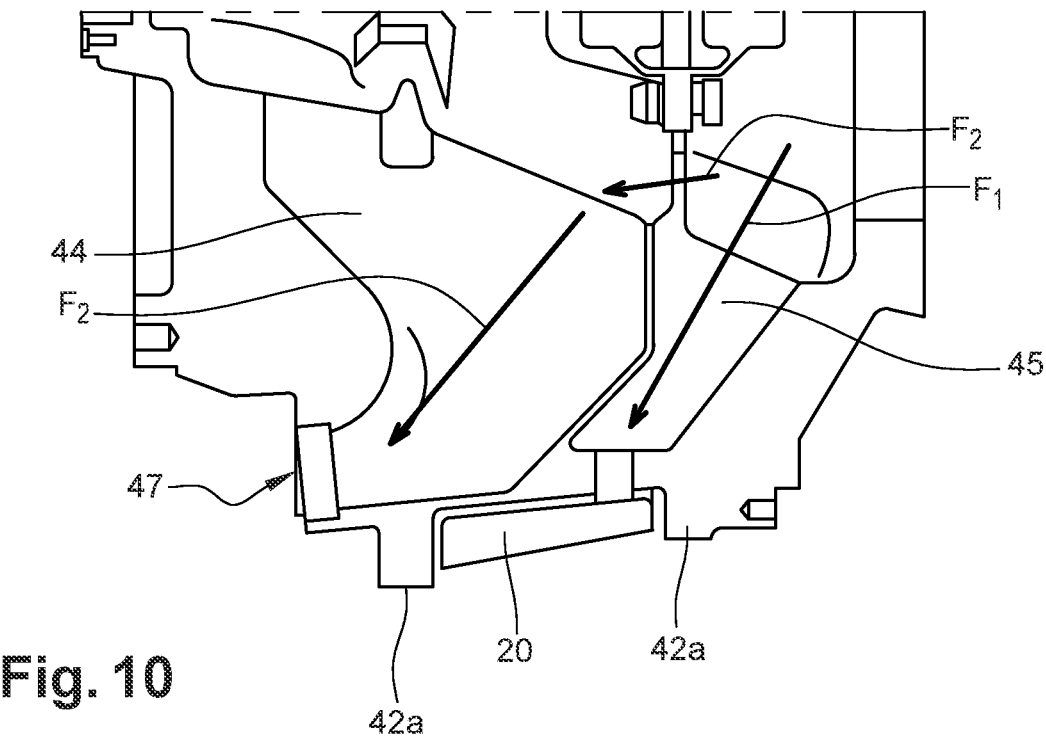
FIG. 10 is a view analogous to FIG. 8 illustrating the lubrication oil path in a turbomachine casing according to the invention.

The hollow arm 43' ensures the overall recovery by gravity of lubrication oil from the reducer 10 of the enclosure E1. Referring to FIGS. 9 and 10, the hollow arm 43' comprises a first inner passage 44 of oil recovery and a second inner passage 45 of oil recovery. The first and second passages 44, 45 of oil recovery are formed in the inter-duct casing 42 of the casing 40. They are for example formed by two channels separated by a partition 46 and arranged side by side in a plane passing through the axis of revolution of the inner casing 41 and the inter-duct casing 42.

The first passage 44 is, in a manner known per se, connected to a main oil tank (not shown) and ensures the passage of oil to various parts of the turbomachine such as, for example, the rolling elements of the line shafts of the turbine, the compressor, the fan, . . . .

The main oil tank is connected to a main lubrication circuit which provides lubrication for the reducer 10 when the turbomachine is active.

The second passage 45 of oil recovery has a non-rectilinear shape, e.g. V-shaped. It comprises an opening 45a and a base 45b comprising a hole 45c for engaging the neck 24 of the tank 20.

The second inner passage 45 of oil recovery is configured to allow the recovered oil to be conveyed from the enclosure E1 to the auxiliary tank 20.

Specifically, after lubricating the reducer 10, for example, during normal operation of the turbomachine in which the engine is running, the lubrication oil is drained into the hollow arm 43', it then flows into the passage 45 as shown in FIG. 10 by the arrow F1. In this way, the tank is supplied continuously and spontaneously. When the auxiliary tank 20 is filled, the passage 45 is filled with lubrication oil, which then overflows into the passage 44 to be discharged through the hole 47 to a general oil recovery as shown by the arrows F2 and the main oil tank known per se (not shown).

Advantageously, the opening 45a of the second passage 45 is opposite to the auxiliary tank 20 and extends in a plane P which is intended to be inclined from upstream to downstream downwards when the turbomachine 1 is substantially horizontal.

The tank 20 and the casing 40 thus configured, and in particular the recovery passage 45, make it possible to maintain a sufficient oil level in the auxiliary tank 20, even under the effect of a negative inclination of the turbomachine 1, or under the effects of rolling of the latter.

The auxiliary tank 20 is associated with an auxiliary lubrication circuit (not shown). Thus, the auxiliary tank 20 together with the auxiliary lubrication circuit is an independent unit from the main lubrication circuit and allows the reducer 10 to be lubricated when the main lubrication circuit is not active, for example during particular windmilling operating phases with the turbomachine switched off and the main lubrication circuit not active, thus not requiring the main lubrication circuit to be activated specifically in these particular operating phases of the turbomachine.

The dimensions of the auxiliary tank 20 are such that it contains a sufficient volume of oil to meet the lubrication requirements of the reducer 10 according to the turbomachine during the operating phases of the auxiliary tank 20.

Figure 11:
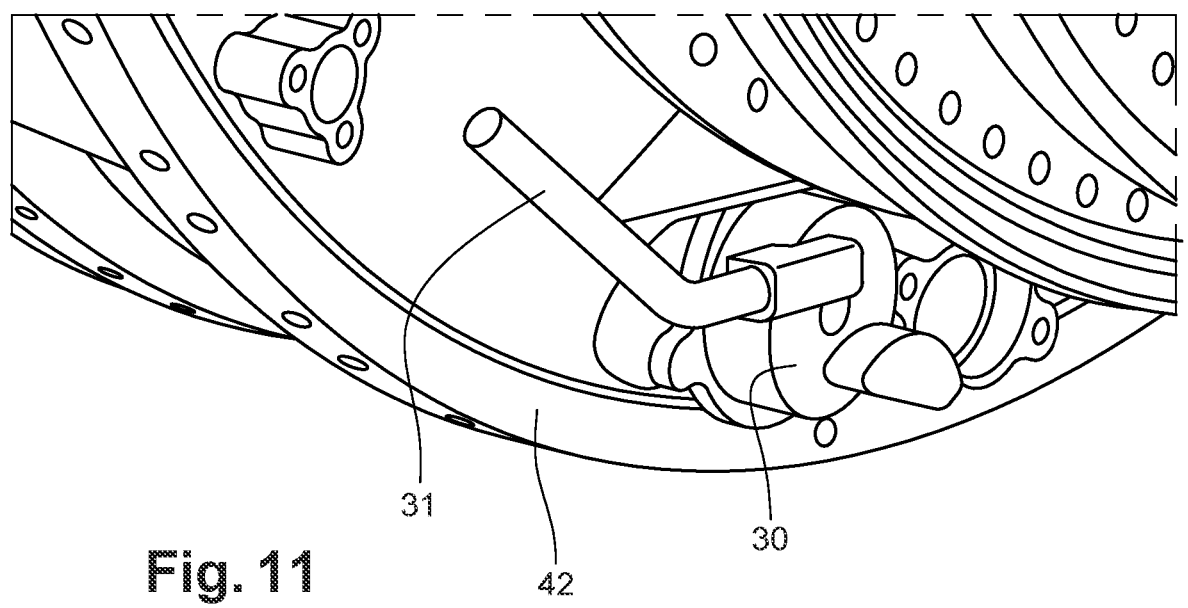
FIG. 11 is a detailed perspective view illustrating the lubrication pump mounted on the turbomachine casing according to the invention.

The tank also comprises an oil outlet connected by a hose 27 to a pump 30 powered for example by an electric motor (not shown). As shown in FIG. 11, the pump 30 is attached to the casing 40.

The present invention also relates to a method for lubricating a reducer 10 of a turbomachine 1 comprising a casing 40 equipped with an auxiliary tank 20.

When a free rotation phase of the fan S is detected, the pump 30 is activated, for example by the electric motor. The lubrication oil is then taken from the auxiliary tank 20 via the oil outlet hose 27 and is conveyed to the reducer 10 or other components requiring lubrication, for example such as bearings, via a hose 31 at the outlet of the pump 30 and via the auxiliary lubrication circuit.

The auxiliary tank 20, the casing 40 and the lubrication method according to the invention are thus configured so that the reducer 10 is always lubricated, regardless of the flight altitudes and the operating phases of the turbomachine.

The invention claimed is:

1. An auxiliary tank for an aircraft turbomachine having a curved shape with a radius of curvature centered on a centering axis corresponding to a longitudinal axis of the turbomachine, the auxiliary tank comprising:
   a cylindrical or frustoconical radially outer wall and three cylindrical or frustoconical radially inner walls arranged opposite said radially outer wall, the three radially inner walls comprising a middle wall and two side walls arranged on either side of the middle wall, the middle wall having a mean radius of curvature greater than a mean radius of curvature of said two side walls so that an inner volume of the auxiliary tank forms a U-shape having a base and a plurality of branches, wherein each of the plurality of branches are formed by lateral volume portions between the two side walls and the radially outer wall, and wherein the base is formed by a middle volume portion between the middle wall and the radially outer wall.

2. The auxiliary tank according to claim 1, further comprising an oil inlet located on the middle wall.

3. The auxiliary tank according to claim 1, wherein the lateral volume portions are connected to a plurality of gas outlets.

4. The auxiliary tank according to claim 1, further comprising an oil outlet connected by a hose to a pump powered by an electric motor.

5. A casing for a turbomachine, comprising two coaxial annular walls, one of the two coaxial annular walls forming an inner casing of the turbomachine, extending inside the other of the two coaxial annular walls, forming an inter-duct casing of the turbomachine, and connected together by an annular row of arms configured to be swept by a flow of gas during operation, at least one of the arms of the annular row of arms being hollow and comprising a first inner passage configured for oil recovery and a second inner passage configured for oil recovery and for conveying oil to the auxiliary tank according to claim 4.

6. The casing according to claim 5, wherein said first and second inner passages are formed in the inter-duct casing and are formed by two channels separated by a partition and arranged side by side in a same plane passing through an axis of revolution of the inner casing and of the inter-duct casing.

7. The casing according to claim 5, wherein the inter-duct casing comprises two radially outer annular rims between which the auxiliary tank is mounted.

8. The casing according to claim 5, wherein the middle wall of the auxiliary tank is located perpendicularly to said at least one of the arms and the side walls are located perpendicularly to a plurality of inter-arm spaces.

9. An aircraft turbomachine comprising a casing according to claim 5.

10. The aircraft turbomachine according to claim 9, further comprising a reducer, a main lubrication oil tank and a main lubrication circuit, an auxiliary oil tank, and an auxiliary lubrication circuit, the auxiliary tank being connected to the reducer via the second inner passage, the main tank and the main lubrication circuit being configured to lubricate the reducer when the turbomachine is active, and the auxiliary tank and the auxiliary lubrication circuit being configured to lubricate the reducer when the turbomachine is not active.

* * * * *